United States Patent
Zhang et al.

(10) Patent No.: US 11,907,232 B2
(45) Date of Patent: Feb. 20, 2024

(54) FACILITATING EFFICIENT IDENTIFICATION OF RELEVANT DATA

(71) Applicant: ADOBE INC., San Jose, CA (US)

(72) Inventors: Wei Zhang, Great Falls, VA (US); Christopher Challis, Alpine, UT (US)

(73) Assignee: Adobe Inc., San Jose, CA (US)

( * ) Notice: Subject to any disclaimer, the term of this patent is extended or adjusted under 35 U.S.C. 154(b) by 172 days.

(21) Appl. No.: 17/146,651

(22) Filed: Jan. 12, 2021

(65) Prior Publication Data
US 2022/0222261 A1 Jul. 14, 2022

(51) Int. Cl.
G06F 16/00 (2019.01)
G06F 16/2457 (2019.01)
G06F 17/18 (2006.01)
H04L 67/306 (2022.01)
H04L 67/50 (2022.01)

(52) U.S. Cl.
CPC ........ *G06F 16/24578* (2019.01); *G06F 17/18* (2013.01); *H04L 67/306* (2013.01); *H04L 67/535* (2022.05)

(58) Field of Classification Search
CPC .............................................. G06F 16/24578
See application file for complete search history.

(56) References Cited

U.S. PATENT DOCUMENTS

| | | | | |
|---|---|---|---|---|
| 8,090,621 B1 * | 1/2012 | Chakrabarti | ....... | G06Q 30/0631 705/26.1 |
| 8,930,204 B1 * | 1/2015 | Igoe | ...................... | G06F 16/335 705/2 |
| 8,930,392 B1 * | 1/2015 | Leichter | .............. | G06F 16/3326 707/723 |
| 10,949,616 B1 * | 3/2021 | Shenoy | .................. | G06F 40/295 |
| 11,263,217 B2 * | 3/2022 | Zimovnov | ......... | G06Q 30/0631 |
| 11,368,414 B1 * | 6/2022 | Shetty | ................. | G06F 16/9566 |
| 2009/0013002 A1 * | 1/2009 | Eggink | ................ | G11B 27/105 |

(Continued)

OTHER PUBLICATIONS

Russo, D., Van Roy, B., Kazerouni, A., Osband, I., & Wen, Z. (2017). A tutorial on thompson sampling. arXiv preprint arXiv:1707.02038.

(Continued)

*Primary Examiner* — Noosha Arjomandi
(74) *Attorney, Agent, or Firm* — Shook, Hardy & Bacon L.L.P.

(57) ABSTRACT

The present technology provides for facilitating efficient identification of relevant metrics. In one embodiment, a set of candidate metrics for which to determine relevance to a user is identified. For each candidate metric, a set of distribution parameters is determined, including a first distribution parameter based on implicit positive feedback associated with the metric and usage data associated with the metric and a second distribution parameter based on the usage data associated with the metric. Such usage data can efficiently facilitate identifying relevance even with an absence of negative feedback. Using the set of distribution parameters, a corresponding distribution is generated. Each distribution can then be sampled to identify a relevance score for each candidate metric indicating an extent of relevance of the corresponding metric. Based on the relevance scores for each candidate metric, a candidate metric is designated as relevant to the user.

16 Claims, 6 Drawing Sheets

(56) References Cited

U.S. PATENT DOCUMENTS

| | | | | |
|---|---|---|---|---|
| 2011/0252027 | A1* | 10/2011 | Chen | G06F 16/24573 707/E17.014 |
| 2011/0302117 | A1* | 12/2011 | Pinckney | G06N 5/048 706/12 |
| 2011/0302158 | A1* | 12/2011 | Sanders | G06F 16/9535 707/723 |
| 2013/0041653 | A1* | 2/2013 | Tseng | G06F 16/90324 704/E11.001 |
| 2017/0337247 | A1* | 11/2017 | Tague | G06F 16/248 |
| 2019/0130904 | A1* | 5/2019 | Homma | G10L 15/18 |
| 2019/0332946 | A1* | 10/2019 | Han | G06F 16/90332 |
| 2020/0334260 | A1* | 10/2020 | Kussmaul | G06F 3/0486 |
| 2020/0341987 | A1* | 10/2020 | Wright | G06N 20/00 |
| 2021/0365500 | A1* | 11/2021 | Gunaselara | G06F 16/9535 |
| 2022/0207094 | A1* | 6/2022 | Dormidontov | G06F 16/951 |
| 2022/0207575 | A1* | 6/2022 | Wilson | G06Q 20/203 |
| 2022/0210033 | A1* | 6/2022 | Higgins | H04L 41/5093 |
| 2022/0222261 | A1* | 7/2022 | Zhang | G06F 16/285 |

OTHER PUBLICATIONS

Chapelle, O., & Li, L. (2011). An empirical evaluation of thompson sampling. In Advances in neural information processing systems (pp. 2249-2257).

Craswell, N., Zoeter, O., Taylor, M., & Ramsey, B. (Feb. 2008). An experimental comparison of click position-bias models. In Proceedings of the 2008 international conference on web search and data mining (pp. 87-94).

Auer, P., Cesa-Bianchi, N., & Fischer, P. (2002). Finite-time analysis of the multiarmed bandit problem. Machine learning, 47(2-3), 235-256.

* cited by examiner

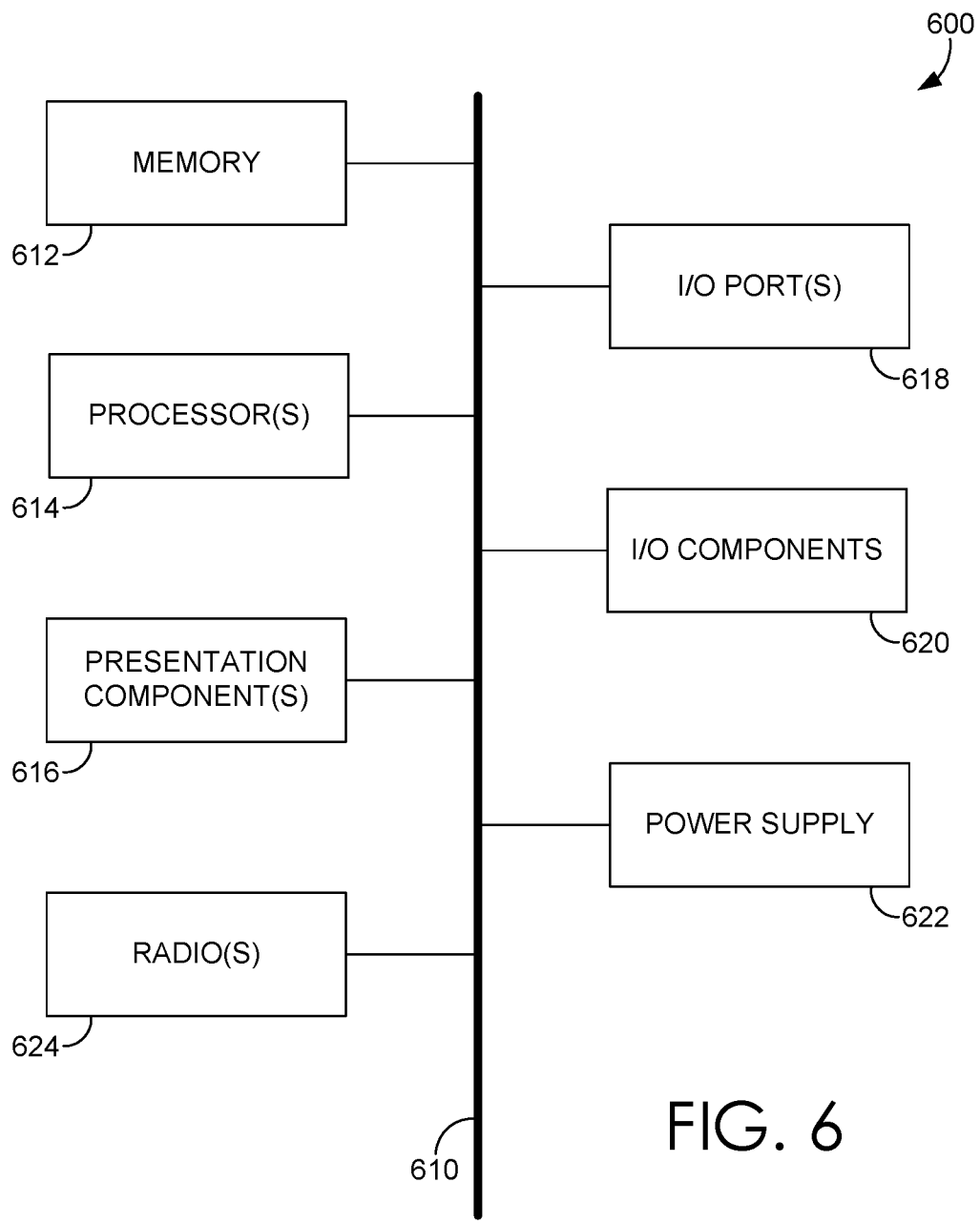

FACILITATING EFFICIENT IDENTIFICATION OF RELEVANT DATA

BACKGROUND

In a data analysis environment, an extensive amount of data associated with numerous metrics can be captured. As providing such a large amount of data to a user would be overwhelming and time consuming, a portion of data is typically identified and provided to a user. Determining what data to provide to users, however, can be difficult and inaccurate. Generally, individuals have interests in different metrics that capture different perspectives of data, providing even more difficulty and inaccuracy in surfacing data desired by a user. As such, to provide particular data that is desired by a user, feedback may be obtained and used to identify such desired data.

In some conventional systems, explicit feedback can be provided by a user, which can then be used to identify what data to provide the user. Many implementations, however, are not accommodating to obtaining explicit feedback. For example, in some cases, it is desired to avoid requesting user feedback so as to reduce user burden and simplify the user experience. In other cases, various communication channels and aspects are not amenable to explicit feedback. For example, when data is provided to a user in an email, it is difficult to request explicit feedback (e.g., a thumbs up selection). Still further, even where explicit feedback may be provided, individuals often do not provide such feedback, resulting in a limited amount of data that can be used to identify preferred or desired data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As such, embodiments described herein facilitate identification of relevant metrics for users. In particular, embodiments herein enable identification of metrics that are relevant to a particular user without the user needing to have previously provided explicit feedback indicating desired metrics or metrics deemed relevant to the user. To do so, metrics are identified as relevant to a particular user based on previous implicit feedback, such as implicit positive feedback, and/or usage data. In particular, distribution parameter values can be determined for a metric using implicit positive feedback and usage data associated with the metric. The distribution parameter values can then be used to generate a distribution, which may be sampled to identify relevance of the metric to the user. As such, by employing embodiments of the present innovation, the most relevant metrics can be selected and presented to the appropriate individuals, for example, by surfacing them at the top of alerting emails or other communication channels.

BRIEF DESCRIPTION OF THE DRAWINGS

The technology described herein is described in detail below with reference to the attached drawing figures, wherein:

FIG. 6 is a block diagram of an exemplary computing environment suitable for use in implementing aspects of the technology described herein.

DETAILED DESCRIPTION

Figure 1:
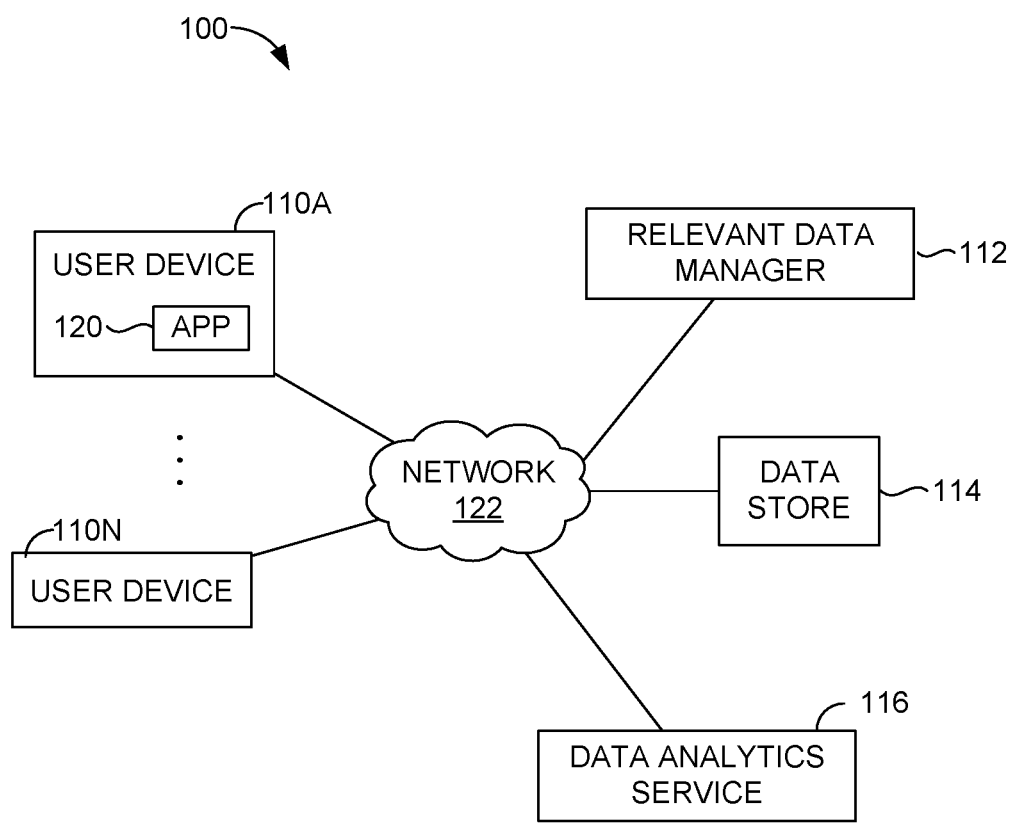
FIG. 1 is a block diagram of an exemplary system for facilitating efficient identification of relevant metrics, suitable for use in implementing aspects of the technology described herein.

The technology described herein is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

In a data analysis environment, data associated with numerous metrics are generally captured. Given the extensive amount of metrics for which data is captured, it would be burdensome, time consuming, and overwhelming to provide data associated with each metric to a user. For example, users may disengage with the data after being unable to locate desired information. As such, typically, a portion of data is identified and provided to a user. For example, in detecting anomalies in data, only a portion of metrics associated with such anomalies may be presented to a user.

Determining what data to provide to users, however, can be difficult and inaccurate. Generally, individuals have interests in different metrics that capture different perspectives of data, providing even more difficulty and inaccuracy in surfacing data desired by a user. For example, management may desire to view revenue or financial data, whereas an analyst may desire to view data related to website operation, functionality, and traffic.

As such, to provide particular data that is desired by a user, feedback may be obtained and used to identify such desired data. In some systems, explicit feedback can be provided by a user, which can then be used to identify what data to provide the user. Explicit feedback generally provides an explicit or clear indication that an item is interesting or uninteresting, or approved or disapproved. For example, in connection with text or an image, a user may select a positive icon (e.g., thumbs up symbol) to provide a positive explicit feedback or a negative icon (e.g., thumbs down symbol) to provide a negative explicit feedback. Other examples of explicit feedback may include a ranking or comment indicating an intent of a positive or negative association with an item (e.g., text and/or image).

Many implementations, however, are not accommodating to obtaining explicit feedback. For example, in some cases, it is desired to avoid requesting user feedback so as to reduce user burden and simplify the user experience. In other cases, various communication channels and aspects are not amenable to explicit feedback. For example, when data is provided to a user in an email, it is difficult to request explicit feedback (e.g., a thumbs up selection). Still further, even where explicit feedback may be provided, individuals often do not provide such feedback, resulting in a limited amount of data that can be used to identify preferred or desired data.

As such, embodiments described herein facilitate identification of relevant metrics for users. In particular, embodiments herein enable identification of metrics that are relevant to a particular user without the user needing to have previously provided explicit feedback indicating desired metrics or metrics deemed relevant to the user. To do so, metrics are identified as relevant to a particular user based on previous implicit feedback, such as implicit positive feedback, and/or usage data. Implicit positive feedback can be obtained in association with a user based on the user selecting or clicking on a metric from a list of metrics. For example, assume an indication of various metrics is provided to a user via an email. A user selection on one of the metric indications can provide implicit positive feedback of interest in that metric. Usage data generally refers to usage or access of a particular metric, or data associated therewith, by a user. For instance, a user may access data associated with a particular metric via an analytics website or application. Such an access can contribute to learning user preferences.

Using embodiments described herein, user preferences can be learned through the user's interactions with various communication channels, e.g., emails and websites. In accordance with learning such preferences, metrics can be identified as relevant to the user using corresponding relevance scores. For example, even though many important events (e.g., a drop in sales or issues with the website) can happen within an organization, the executive team might be primarily interested in a revenue metric, while a site reliability engineer may be interested in a latency metric and marketers may be interested in a clickthrough metric. As such, by employing embodiments of the present innovation, the most relevant items can be selected and presented to the appropriate individuals, for example, by surfacing them at the top of alerting emails or other communication channels.

In operation, upon identifying a set of candidate metrics to analyze as potential relevant metrics, distribution parameters associated with each metric are identified or determined. In some cases, the distribution parameters, including a positive and negative parameter, are identified via a data store. In other cases, the distribution parameters, such as a positive and negative parameter, are determined by performing a model update using feedback and usage data. In some implementations, a positive parameter is determined using both feedback data and usage data, and the negative parameter is determined using usage data.

The distribution parameters for each metric can then be used to generate corresponding distributions. For example, for a first metric, the corresponding distribution parameters are used to generate a first distribution, and for a second metric, the corresponding distribution parameters are used to generate a second distribution. In embodiments, the generated distributions are Beta distributions.

For each metric, a sampling of the distribution can be taken to generate a relevance score for the corresponding metric. The relevance scores are used to rank the various candidate metrics and identify which of the metrics are more relevant to the user. The selected or top metrics may then be provided to a user or used to identify related data associated with such relevant metrics. For example, assume a revenue metric is identified as relevant to a user. In such a case, an indication of the revenue metric may be provided to a user. Additionally or alternatively, data, anomalies, etc. associated with the revenue metric may be identified and provided to the user.

Advantageously, embodiments described herein have a very low computational complexity such that distribution parameter updating and relevance scoring can happen in real-time. Moreover, as only a relatively small number of parameters are used, storing and retrieving such data from a database can be efficiently performed. As such, identifying relevant metrics can be performed for a very large number of user and metric combinations.

Further, the metrics identified as relevant are particular to, or customized for, a user without requiring any explicit user feedback. As such, the workflow is streamlined and user friendly. Tailoring data in relation to relevant metrics, as described herein, enables users to view data relevant to the user in an efficient and accurate manner. Advantageously, in addition to handling the challenge of effectively performing without negative feedback, such technology also addresses the problem of user preference drifting over time.

Although identifying related metrics is generate referred to herein, as can be appreciated, embodiments may more generally identify related data or data items. A metric can be viewed as a type of a data item. As such, identifying relevant data items can be performed in a similar manner as that described herein in relation to identifying related metrics.

Overview of Exemplary Environments for Facilitating Efficient Identification of Relevant Metrics Referring initially to FIG. 1, a block diagram of an exemplary network environment 100 suitable for use in implementing embodiments described herein is shown. Generally, the system 100 illustrates an environment suitable for facilitating efficient identification of relevant metrics. Among other things, embodiments described herein effectively and efficiently determine metrics relevant to a particular user to provide to the user. Generally, in accordance with embodiments described herein, metrics relevant to a user can be determined and provided to the user without the user providing, or needing to provide, explicit feedback indicating whether such a metrics is or is not interesting to the user. As described herein, a metric, or metric type, may correspond with a quantitative measure used to gauge performance or progress within an organization. By way of example only, and without limitation, metrics, or metric types, may include, or relate to, throughput, click rates, conversions, productivity, page views, revenue, visits, visitors, purchases, etc. Such metrics may be used for performing analytics to make various decisions. Although embodiments of the present disclosure generally discuss identifying relevant metrics, as can be appreciated, embodiments may more generally identify relevant data or data items. A data item generally refers to a type, subject, or topic of data. A metric may be one form of a data item. As such, by identifying data items relevant to a user, embodiments described herein determine types of data relevant to a user.

The network environment 100 includes user devices 110a-110n (referred to generally as user device(s) 110), a relevant data manager 112, a data store 114, and a data analytics service 116. The user device(s) 110a-110n, the relevant data manager 112, the data store 114, and the data analytics service 116 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. For example, the user device 110a-110n may be in communication with the relevant data manager 112 via a mobile network or the Internet, and the relevant data manager 112 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another, for example, at least a portion of the relevant data manager 112 and/or data store 114 may be integrated with the user device 110 and/or data analytics service 116. For instance, a portion of the relevant data manager 112 may be integrated with a server (e.g., data analytics service) in communication with a user device, while another portion of the relevant data manager 112 may be integrated with the user device (e.g., via application 120).

The user device 110 can be any kind of computing device capable of facilitating efficient identification of relevant metrics. For example, in an embodiment, the user device 110 can be a computing device such as computing device 600, as described above with reference to FIG. 6. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating identification of relevant metrics. In some implementations, the application(s) comprises a web application, which can run in a web browser, and could be hosted at least partially server-side (e.g., via data analytics service 116). In addition, or instead, the application(s) can comprise a dedicated application. In some cases, the application is integrated into the operating system (e.g., as a service). As one specific example application, application or service 120 may be a data analysis tool that provides various analytics data and data visualizations. Such an application may be accessed via a mobile application, a web application, or the like. As another example, an application may alternatively or additionally include an email service or other communication service. As can be appreciated, and in accordance with various embodiments described herein, the user device may operate multiple applications (e.g., an email application or website, a web analytics application or website, etc.).

User device 110 can be a client device on a client-side of operating environment 100, while relevant data manager 112 and/or data analytics service 116 can be on a server-side of operating environment 100. Relevant data manager 112 and/or data analytics service 116 may comprise server-side software designed to work in conjunction with client-side software on user device 110 so as to implement any combination of the features and functionalities discussed in the present disclosure. An example of such client-side software is application (or service) 120 on user device 110. This division of operating environment 100 is provided to illustrate one example of a suitable environment, and it is noted there is no requirement for each implementation that any combination of user device 110, relevant data manager 112, and/or data analytics service 116 to remain as separate entities.

In an embodiment, the user device 110 is separate and distinct from the relevant data manager 112, the data store 114, and the data analytics service 116 illustrated in FIG. 1. In another embodiment, the user device 110 is integrated with one or more illustrated components. For instance, the user device 110 may incorporate functionality described in relation to the relevant data manager 112. For clarity of explanation, embodiments are described herein in which the user device 110, the relevant data manager 112, the data store 114, and the data analytics service 116 are separate, while understanding that this may not be the case in various configurations contemplated.

As described, a user device, such as user device 110, can facilitate efficient identification of relevant metrics. Metrics is broadly used herein and may refer to any type of metric. For instance, a relevant metric may be a type of metric associated with an organization. Metrics may relate to various aspects of organizational performance, such as revenue, financial data, conversions, clicks, or other marketing metrics or productivity metrics.

A user device 110, as described herein, is generally operated by an individual or entity interested in viewing relevant data (e.g., related to a metric). In some cases, such an individual may be an individual of an organization for which data is captured. As can be appreciated, a user interested in viewing relevant data related to an organization need not be an employee, member, or owner of the organization. For example, in some cases, a user desiring to view performance data may be an individual gathering data across an industry.

In some cases, identification of relevant metrics may be initiated at the user device 110. For example, in some cases, a user may select an option or setting indicating a desire to view relevant metrics, or data associated therewith. As can be appreciated, in some cases, a user of the user device 110 that may initiate identification of relevant metrics is a user that can view relevant metrics, and/or data associated therewith.

Identification of relevant metrics may be initiated and/or presented via an application (or service) 120 operating on the user device 110. In this regard, the user device 110, via an application and/or service 120, might allow a user to initiate an identification of relevant metrics. The user device 110 can include any type of application and may be a stand-alone application, a mobile application, a web application, or the like. In some cases, the functionality described herein may be integrated directly with an application or may be an add-on, or plug-in, to an application. Examples of applications that may be used to initiate and/or present metric-related data include data analytics applications.

Such identification of relevant metrics may be initiated at the user device 110 in any manner. For instance, upon accessing a particular application (e.g., a data analytics application), a user may be presented with, or navigate to, options associated with metrics. In such a case, a user may be presented with an option to view alerts (e.g., anomaly data alerts) associated with relevant metrics (i.e., metrics identified as relevant to the user).

In other embodiments, identification of relevant metrics may be initiated via another component (e.g., relevant data manager 112). For example, and as described more fully herein, relevant metrics may be identified automatically on a periodic basis or based on an occurrence of an event (e.g., a particular number of anomalies detected in a data set). Irrespective of how identification of relevant data items is initiated, such identified relevant metrics, or data associated therewith, can be provided to a user device, such as user device 110 via application 120. For example, in some cases, relevant metrics may be provided to a user device for presentation to a user. Alternatively or additionally, data associated with such relevant metrics may be presented. For instance, assume a performance metric of revenue is identified as a metric relevant to a particular user. In such a case, revenue values, revenue anomalies, graph indication revenue, etc. associated with the revenue metric may be provided for presentation to the user.

The user device 110 can communicate with the relevant data manager 112 to provide implicit feedback, provide usage data, and/or obtain relevant metrics, or data associated therewith. In embodiments, for example, a user may utilize the user device 110 to view alerts (e.g., notifications related to anomalies provided in an email). The user may select an indication of a metric (e.g., via a link), which can provide implicit feedback back to the relevant data manager 112. For instance, in some embodiments, the network 122 might be the Internet, and the user device 110 interacts with the relevant data manager 112 (e.g., directly or via data analytics service 116) to initiate providing implicit feedback. In other embodiments, for example, the network 122 might be an enterprise network associated with an organization. It should be apparent to those having skill in the relevant arts that any number of other implementation scenarios may be possible as well.

With continued reference to FIG. 1, the relevant data manager 112 can be implemented as server systems, program modules, virtual machines, components of a server or servers, networks, and the like. At a high level, the relevant data manager 112 manages identification of relevant metrics. In particular, the relevant data manager 112 can obtain implicit feedback and usage data, such as implicit feedback and/or usage data from user device(s) 110 and/or data analytics service 116. Using such data, the relevant data manager 112 can determine relevant metrics for a particular user. Generally, the relevant data manager 112 can receive implicit feedback and/or usage data from any number of devices. As such, the relevant data manager 112 can identify and/or collect data from various user devices, such as user devices 110a-110n, and data analytics services, such as data analytics service 116. In this regard, the relevant data manager 112 can retrieve or receive data collected or identified at various components, or sensors associated therewith.

In performing identification of a relevant metric(s) for a particular user, distribution parameters can be identified for each candidate metric or a set of candidate metrics. For example, assume a set of 10 candidate metrics are to be used for identifying a relevant metric(s) (e.g., 10 metrics are associated with anomalies). In such a case, for each candidate metric, a set of distribution parameters are identified. Distribution parameters can be accessed from a data store, such as data store 114 and/or dynamically determined (e.g., via parameter update logic described herein). In embodiments, distribution parameters may include a positive parameter ($\alpha$) and a negative parameter ($\beta$). The distribution parameters are generally determined based on implicit feedback (e.g., implicit positive feedback) and/or usage data. As described, in some cases, the relevant data manager 112 can receive implicit feedback for determining relevant metrics via the user device 110 (or other device). Implicit feedback received from a device, such as user device 110, can include selection of a link to view associated metric information. The relevant data manager 112 can also receive usage data for determining relevant data items, for example, via the user device 110 or the data analytics service 116. In accordance with obtaining such data, the relevant data manager 112 can access and utilize implicit feedback data and/or usage data to determine a relevant metric(s) for a user.

Such implicit feedback data and/or usage data can be initially collected at remote locations or systems and transmitted to data store 114 for access by relevant data manager 112. In accordance with embodiments described herein, implicit feedback data and/or usage data may occur at data analytics service 116. In some cases, data analytics service 116, or portion thereof, may be services that analyze data and provide various analytics related to such data. As such, data analytics service 116, or components associated therewith, can be used to collect various types of data, such as usage data. For example, in some embodiments, usage data may be obtained and collected at data analytics service 116 via one or more sensors, which may be on or associated with one or more user devices and/or other computing devices. As used herein, a sensor may include a function, routine, component, or combination thereof for sensing, detecting, or otherwise obtaining information, such as usage data, and may be embodied as hardware, software, or both.

Although generally discussed as implicit feedback data and/or usage data provided to the data store 114 and/or relevant data manager 112 via user devices 110 and/or data analytics service 116, such data may additionally or alternatively be obtained at and provided from another device or server, for example, that collects data based on user interactions with user devices. Implicit feedback data and/or usage data can be obtained periodically or in an ongoing manner (or at any time) and provided to the data store 114 and/or relevant data manager 112 to facilitate efficient identification of relevant metrics.

In accordance with embodiments described herein, and as more fully described below with reference to FIG. 2, the relevant data manager 112 may utilize the distribution parameters (i.e., based on implicit feedback data and/or usage data) to generate distributions. For example, the relevant data manager 112 may access or identify a positive and negative distribution parameter associated with a particular metric to generate a distribution for the metric. In embodiments, the generated distributions may be in the form of a Beta distribution. The generated distributions can then be used to determine a relevance score for the corresponding metric. For example, a sampling of a distribution can be made to identify a relevance of a metric associated with the distribution. The relevance scores of various metrics can then be compared to one another to rank and/or select a particular set of metrics, or data associated therewith, to provide to a user.

In some cases, the metrics identified as relevant can be provided to the user device 110 for display to the user. In other cases, the relevant data manager 112 and/or data analytics service 116 may use such data (e.g., identified relevant metrics) to perform further data analysis and/or provide data related to the relevant metric to the user device 110. In some embodiments, the data analytics service 116 can reference the identified relevant metrics and use such data to perform further data analysis and/or provide relevant data to the user device 110. The data analytics service 116 may be any type of server or service that can analyze data and/or provide information to user devices. One example data analytics service 116 includes a data analytics service, such as Adobe® Analytics, provided by Adobe®, that can provide various data analytics for presentation to users. Although data analytics service 116 is shown separate from the relevant data manager 112, as can be appreciated, the relevant data manager 112 can be integrated with the data analytics service 116, or other service or service. The user device 110 can present received data or information in any number of ways, and is not intended to be limited herein. As an example, information based on identified relevant metrics can be presented via application 120 of the user device.

Advantageously, utilizing implementations described herein enable identification of relevant metrics to be performed in an efficient and accurate manner. As the embodiments described herein have very low computation complexity, the distribution parameter updating and relevance scoring can be performed in real time. Moreover, only a small number of distribution parameters are used and, as a result, storing and retrieving such data from a database can be efficiently performed. Accordingly, resources can accommodate determining relevant metrics and providing relevant data for a large number of user and metric combinations. Further, the identified relevant metrics can dynamically adapt to align with information desired by the user. As such, a user can view desired information and can assess the information accordingly.

Figure 2:
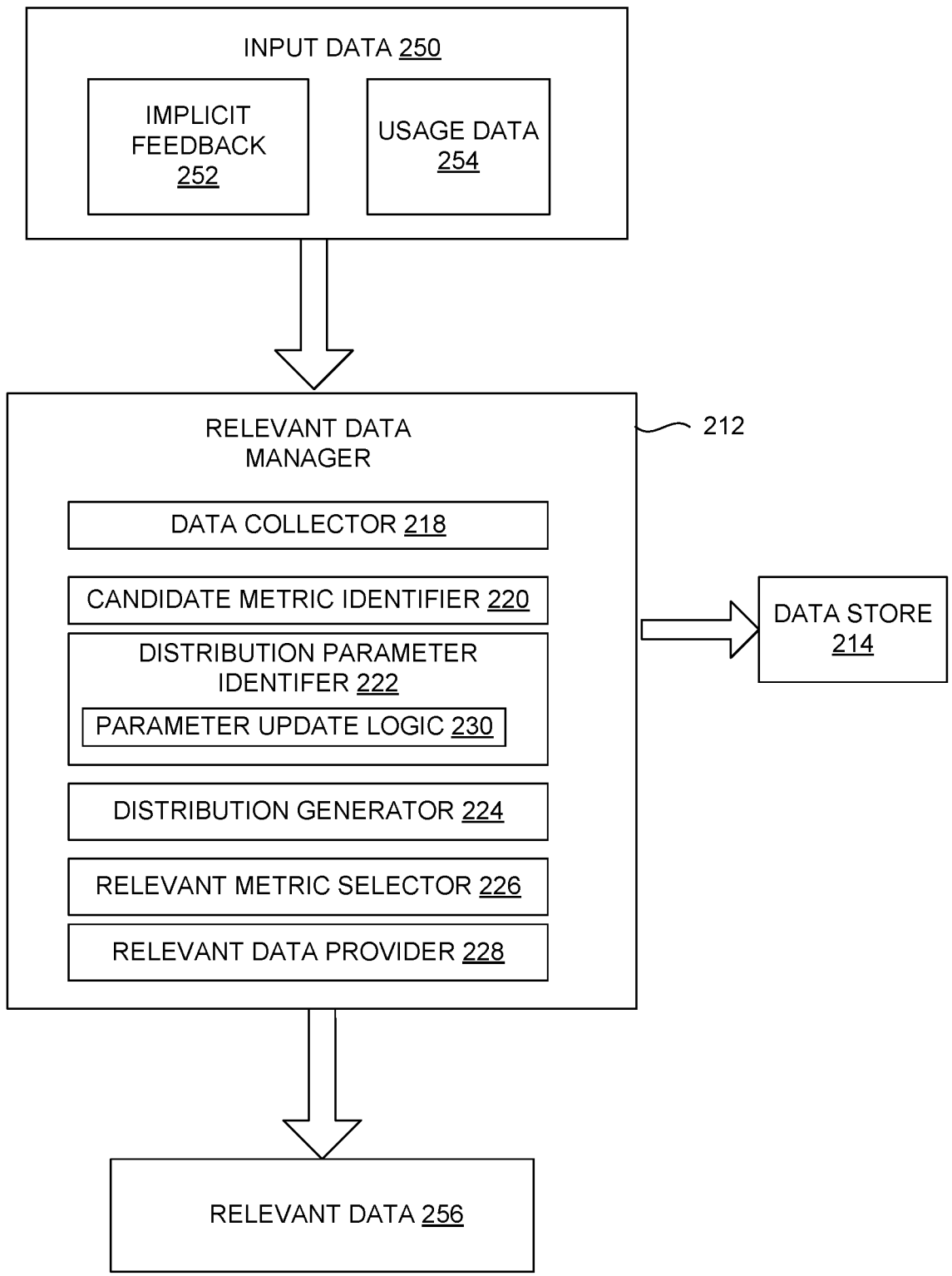
FIG. 2 is an example implementation for performing efficient identification of relevant metrics, via a relevant data manager, in accordance with aspects of the technology described herein.

Turning now to FIG. 2, FIG. 2 illustrates an example implementation for facilitating efficient identification of relevant metrics via relevant data manager 212. The relevant data manager 212 can communicate with the data store 214. The data store 214 is configured to store various types of information accessible by the relevant data manager 212 or other server. In embodiments, user devices (such as user devices 110 of FIG. 1), relevant data manager 212, and/or a data analytics service (such as data analytics service 116 of FIG. 1) can provide data to the data store 214 for storage, which may be retrieved or referenced by any such component. As such, the data store 214 may store implicit feedback (e.g., implicit positive feedback), usage data, distribution parameters, distributions, relevance scores, or the like.

In operation, the relevant data manager 212 is generally configured to manage facilitating efficient identification of relevant metrics. In embodiments, the relevant data manager 212 includes a data collector 218, a candidate metric identifier 220, a distribution parameter identifier 222, a distribution generator 224, a relevant metric selector 226, and a relevant data provider 228. Some embodiments of relevant data manager 212 may also utilize parameter update logic 230, as described herein. According to embodiments described herein, the relevant data manager 212 can include any number of other components not illustrated. In some embodiments, one or more of the illustrated components 218-230 can be integrated into a single component or can be divided into a number of different components. Components 218-230 can be implemented on any number of machines and can be integrated, as desired, with any number of other functionalities or services.

The data collector 218 can receive or obtain input data 250 from various components for utilization in determining relevant metrics. The data collector 218 can obtain implicit positive feedback 252 and/or usage data 254. Such data can be received from any number of devices or components. For example, implicit positive feedback 252 may be received from various user devices, and usage data 254 may be received from a data analytics service.

As described, implicit positive feedback 252 can be obtained by the data collector 218. In this regard, the data collector 218 may obtain implicit positive feedback 252 from user devices. Implicit positive feedback generally refers to implicit feedback indicating a positive perspective related to a metric that is not explicitly provided. For example, as described, an explicit feedback may include a thumbs up, or other specific indication, specifically designating a positive reflection of a particular metric. On the other hand, an implicit feedback may be provided by a selection of an item (e.g., metric indication) indicating an interest in the item. In this way, a user may be initiating or performing an action for one reason (e.g., to view data, access data, etc.) and thereby provide an implied, or implicit, indication of an interest in that metric.

As one example, a user device may be provided with an email having a number of links associated with various metrics. For instance, an email may be provided by relevant data provider 228 including a list or indication of various metrics identified as relevant for the user. The user may select on one of the metric links to view data associated therewith (e.g., a metric value, an anomaly indication, etc.). By selecting on the metric link, the user provides positive implicit feedback. Such positive implicit feedback can be obtained directly or indirectly via the data collector 218. For example, the positive implicit feedback may be communicated directly from the user device to the relevant data manager 212. In other cases, the positive implicit feedback may be captured via another component, such as an analytics service, and thereafter provided to the relevant data manager 212.

Although not illustrated, in some embodiments, a negative implicit feedback may also be obtained by the data collector 218. Negative implicit feedback may be captured in a number of ways. For example, assume a user selects a link related to a fourth metric presented in a list. In such a case, negative implicit feedback can be assumed or associated with the first three metrics presented in the list.

In addition to positive implicit feedback 252, the data collector 218 may also collect usage data 254. Usage data generally refers to access to, or viewing of, a data associated with a particular metric. For example, assume a user logs into an analytics website and, thereafter, accesses data related to a revenue metric. In such a case, usage data related to the revenue metric can be obtained. The usage data may reflect a count or number of access times, a length of access times, etc. Such usage data can be obtained directly or indirectly via the data collector 218. For example, the usage data may be communicated directly from the user device to the relevant data manager 212. In other cases, the usage data may be captured via another component, such as an analytics service, and thereafter provided to the relevant data manager 212.

Any implicit positive feedback and/or usage data may be stored, for instance, at data store 214. The data may be obtained or collected on a periodic basis, as data is received from remote devices, or upon an occurrence of an event (e.g., initiating of identification of relevant data items). Such data may be stored in the data store 214 until used to identify relevant metrics. In other cases, the data may be accessed from the data store 214 to identify relevant metrics.

The candidate metric identifier 220 is generally configured to identify a set of candidate metrics. In this regard, the candidate metric identifier 220 identifies candidate metrics for which a corresponding relevancy is to be determined for a user. As described, a metric refers to any type of metric or outcome desired to be measured or scored. Metrics may be related to productivity, performance, monetary aspects, and/or the like.

In some cases, each available metric may be analyzed for relevancy to a user. In such cases, the candidate metric identifier 220 may identify each metric as a candidate metric. In other cases, the candidate metric identifier 220 may identify a set or portion of metrics as candidate metrics. For example, rather than identifying relevance of each metric, the candidate metric identifier 220 can identify a portion of metrics for which relevance is determined.

Such candidate metrics can be identified in any of a number of ways. In one embodiment, any metrics for which an anomaly has been identified (e.g., within a certain time period) may be identified as candidate metrics. For instance, assume relevant data, such as an anomaly alert, is provided to a user on a weekly basis. In such a case, metrics associated with anomalies detected in the past week may be identified and designated as candidate metrics. Various other implementations may be used to identify a set of candidate metrics. For instance, a set of metrics may be randomly identified as candidate metrics. As another example, a set of metrics previously selected or specified by a user may be identified as candidate metrics. As yet another example, a set of metrics related to a user's position within an organization may be identified as candidate metrics (e.g., a first set of metrics may be selected for a user in a marketing position, and a second set of metrics may be selected for a user in a management position).

The candidate metric identifier 220 may be triggered or initiated to identify candidate metrics in any manner. For example, as described herein, identification of candidate metrics may be initiated based on an expiration or lapse of a predetermined time period. For instance, in cases that an electronic communication (e.g., email) is provided to a user on a weekly basis, the candidate metric identifier 220 may identify candidate metrics on a weekly basis. As another example, identification of candidate metrics may be initiated based on an occurrence of an event. For instance, in cases that a particular number (e.g., 50) of metrics are identified as being associated with anomalies, identification of candidate metrics may be performed. As yet another example, a user may explicitly or implicitly indicate a desire to review relevant metrics, or data associated therewith.

Based on a candidate set of metrics, a set of distribution parameters corresponding with the candidate metrics are obtained by the distribution parameter identifier 222. In embodiments, the distribution parameter identifier 222 can obtain distribution parameters that correspond with each of the candidate metrics. As described, such distribution parameters may include a positive distribution parameter and a negative distribution parameter. By way of example only, assume a first candidate metric and a second candidate metric are identified for determining relevancy to a user. In such a case, a positive distribution parameter and a negative distribution parameter are identified for the first candidate metric, and a positive distribution parameter and a negative distribution parameter are identified for the second candidate metric. The positive distribution parameter generally refers to $\alpha$ parameter, and the negative distribution generally refers to the $\beta$ parameter that are used to characterize a beta distribution. Such parameters are used to shape the distribution. Negative implicit feedback need not be obtained, but a low usage count can serve as the implicit negative feedback.

As used herein, a positive distribution parameter can generally refer to a positive feedback (e.g., number of positive feedbacks), and a negative distribution parameter can generally refer to a negative feedback (e.g., number of negative feedbacks). In cases in which there is no negative feedback, the beta value may not change when there is no decay in the parameters. As noted herein, the negative distribution parameter may, but need not, include a number of negative feedbacks (e.g., beta value remains a consistent value) and usage count can serve additionally or alternatively as the implicit negative feedback. In this regard, both the positive distribution parameter and the negative distribution parameter can additionally, or alternatively, consider the usage data. Such usage data may be thought of as synthetic feedback based on a number of usages indicative of user preferences. Such usage data is generally translated to positive for highly accessed metrics or negative for seldom used metrics. In embodiments, alpha is updated with $$\frac{c_i}{\Omega},$$

and beta is updated with $$1 - \frac{c_i}{\Omega}.$$

As such, when $$\frac{c_i}{\Omega}$$

is relatively large, meaning me metric is used more frequently (among the most accessed metrics) (e.g.

$$\frac{c_i}{\Omega}$$

is 0.9, $$1 - \frac{c_i}{\Omega} = 0.1).$$

Accordingly, a nigner positive distribution parameter and lower negative distribution parameter will result. On the other hand, for a rarely accessed metric, (e.g., $$\frac{c_i}{\Omega}$$

is 0.02 and $$1 - \frac{c_i}{\Omega} = 0.98).$$

This leads to lower positive distribution parameter and higher negative distribution parameter, so it will be less likely selected next time.

In some cases, such distribution parameters can be accessed via data store 214. For example, distribution parameters previously determined (e.g., via parameter update logic 230) can be stored in data store 214 and accessed by distribution parameter identifier 222 when appropriate or desired. Such data can be stored in the data store 214 (e.g., via an index or lookup system) for subsequent utilization by the relevant data manager 212.

As can be appreciated, the distribution parameter identifier 222 can identify distribution parameters (e.g., via the data store 214) associated with a particular user for the set of candidate metrics. As described, the user generally refers to the particular user for which identification of relevant metrics is desired to be determined. As such, in some cases, a user identifier and/or candidate metric identifiers may be used to determine which distribution parameters to obtain for performing identification of relevant metrics.

In addition to obtaining distribution parameters for a particular user, the distribution parameter identifier 222 may also obtain distribution parameters in accordance with candidate metrics (e.g., identified via candidate metric identifier 220). By way of example only, assume a candidate metric identifier 220 identifies 10 metrics out of 300 that correspond with anomalies in the past week. In such a case, the distribution parameter identifier 222 can obtain distribution parameters, such as a positive distribution parameter and a negative distribution parameter, for each of the identified 10 metrics.

The distribution parameter identifier 222 can include a parameter update logic 230 that is used to generate and/or update distribution parameters. In some cases, the parameter update logic 230 may operate in real time, that is, as identification of relevant metrics occurs. For example, upon identifying a set of candidate metrics, the parameter update logic 230 may execute to identify corresponding distribution parameters (or distribution parameters for all metrics). In other cases, the parameter update logic 230 may operate to identify distribution parameters for metrics and update such metric parameters, for example, in a data store 214 for later access by the distribution parameter identifier 222. For example, the parameter update logic 230 may operate on a periodic basis to identify or update metric parameters for each metric.

The parameter update logic 230 may include rules, conditions, associations, classification models, algorithms, or the like to generate and/or update distribution parameters associated with various metrics (e.g., all metrics or the set of candidate metrics). Parameter update logic 230 may take different forms depending on the mechanism used to determine distribution parameters. For example, parameter update logic 230 may comprise a statistical model, fuzzy logic, neural network, finite state machine, support vector machine, logistic regression, clustering, or machine-learning techniques, similar statistical classification processes, or combinations of these to identify distribution parameters.

As described, the parameter update logic 230 can generate a positive distribution parameter and/or a negative distribution parameter for a metric(s). The distribution parameters generally represent parameters for a distribution, such as a Beta distribution. The Beta distribution includes two parameters, α and β. Generally, the Beta distribution facilitates calculating a conditional distribution, conditioned on the number of positive feedbacks (positive distribution parameter) and the number of negative feedbacks (negative distribution parameter) that have been observed.

In operation, the parameter update logic 230 may set or establish an initial value for each distribution parameter. In some embodiments, the initial value for each distribution parameter for each parameter may be one. In this regard, for each metric i=0, 1, ... K:

$$\alpha_i=1, \beta_i=1$$

Thereafter, the positive and negative distribution parameters can be updated in accordance with observed data, such as implicit positive feedback and usage data. To do so, the parameter update logic 230 may use a feedback updating process to update the positive parameter based on implicit positive feedback. In one implementation, for each implicit positive feedback received or obtained for a particular metric, the positive parameter a can be increased or incremented (e.g., by one). By way of example, assume the positive parameter a for a particular metric is initially set to "1." Upon obtaining an implicit positive feedback (e.g., selection of a link related to a particular metric), the positive parameter is increased to "2," and upon obtaining another implicit positive feedback, the positive parameter is increased to "3," and so on. Although this example increments the positive parameter by a value of "1," that need not be the case and another value may be used to increment the positive metric.

In some implementations, the parameter update logic 230 may continue incrementing or increasing the positive parameter as implicit positive feedback is obtained or recognized. In some cases, the negative parameter may maintain its original value (e.g., "1"). In such cases, the parameter update logic 230 may impose or define a maximum incremented value such that the positive paraemter is confined such that it does not grow or enlarge indefinitely.

The feedback updating process may be performed on a periodic basis or upon an occurrence of an event. For example, feedback updating to update the positive parameter may be performed to increment the positive parameter on a weekly basis. As another example, feedback updating may be performed to increment the positive parameter as an implicit positive feedback data is obtained or recognized. For instance, upon identifying reception of an implicit positive feedback, the value of the positive parameter may be incremented by a value of "1."

Although the feedback updating process is generally described herein to reflect updates of implicit positive feedback, in some embodiments, the feedback updating process may also be used in a similar manner to update the negative parameter value. For example, as an implicit negative feedback is recognized (e.g., metrics not clicked considered to receive implicit negative feedback), the negative parameter value β may be increased (e.g., by "1"). This type of implicit negative feedback may be referred to herein as direct implicit negative feedback to differentiate from usage data being used as indicating implicit negative feedback.

The parameter update logic 230 may additionally or alternatively use a usage updating process to update the positive parameter and/or negative parameter based on usage counts. In this regard, the parameter update logic 230 takes into account usage data to determine positive parameters and/or negative parameters.

In one embodiment, the parameter update logic 230 determines a positive and a negative parameter for each metric, for example, of the set of candidate metrics. The positive parameter α for the $i^{th}$ metric ($\alpha_i$) and the negative parameter β for the $i^{th}$ metric ($\beta_i$) can be represented as:

For $i = 0, 1, \ldots, K$:

$$\alpha_i = f\left(\alpha_i, \frac{c_i}{\Omega}\right)$$

$$\beta_i = f\left(\beta_i, 1 - \frac{c_i}{\Omega}\right), \text{ wherein } \Omega = \max_{0 \leq i \leq K} c_i$$

The $c_i$ denotes a usage count or measure of the $i^{th}$ metric, and $\Omega$ denotes a maximum or greatest usage count for various metrics during a time period (e.g., a week). Such a maximal usage over all metrics is used to normalize the input for updating. As such, the term $c_i/\Omega$ represents a usage count for a particular metric relative to a highest usage count among a set of metrics. Stated differently, $c_i/\Omega$ may represent a synthetic feedback based on the number of usage. The most accessed, or utilized, metric will be represented as a value of one. Consequently, the distribution parameters $\alpha$ will increase and $\beta$ will decrease in accordance with the below functions, thereby generally resulting in a higher relevancy score. On the other hand, a low or zero usage metric will have $$\frac{c_i}{\Omega}$$

value near zero, thereby leading to a lower relevancy score. In some cases, $\Omega$ may correspond with a greatest usage count for all metrics or for all candidate metrics during a time period.

As shown, the functions used to determine both the positive parameter $\alpha$ and the negative parameter $\beta$ are based on usage count for the metric. As can be appreciated, an updated $\alpha_i$ metric parameter value is also based on a prior (or current) $\alpha_i$. As such, and as provided in an example below, the $\alpha_i$ parameter value can also include the feedback updated value (performed via the feedback updating process), thereby accounting for implicit positive feedback.

In some embodiments, implicit negative feedback may be obtained. In such a case, the feedback updated value can be represented as $\beta_j = \beta_j + 1$ and $\alpha$ will not change for negative feedback.

The function $f(\ )$ included above is generally a function for combining historical distribution parameters with the updated usage data. Such a function can be provided in various forms. Two example functions are provided herein as examples, but are not intended to limit the scope of such functions. One example function is a linear combination function $f^1$ and another example function is a geometric combination function $f^2$:

$$f^1(a, u) = \kappa * a + u$$

$$f^2(a, u) = \sqrt{a^\kappa * u}$$

$\kappa \in [0, 1]$ denotes a decay factor between 0 and 1. The lower the decay factor $\kappa$, the faster $\alpha$ decays. As a result, previous implicit feedback and usage has less influence in the future. This hyper parameter $\kappa$ may be designated, for example, by a developer, user, administrator, or may be a default setting. In one embodiment $\kappa = 0.5$. Modifying $\kappa$ to other values, however, may not significantly modify the convergence. Instead, modifying $\kappa$ may only affect the speed of adjustment for user preference change. For example, the adjustment process may be slower for a larger $\kappa$.

In operation, a metric which has low or zero usage associated therewith can result in a lower $\alpha$ parameter because of the decay factor $\kappa$. Using the linear combination function $f^i$ as an example, assume $\kappa = 0.5$. If a metric corresponds with 0 usage, the Beta distribution parameter $\alpha$ will be reduced by half. As such, the corresponding Beta distribution will shift to the left. Consequently, the metric is more likely to result in a lower relevance score. For metrics with high usages, the distribution parameter $\alpha$ will become higher and likely to result in higher relevance scores. Therefore, indirect negative feedbacks is obtained for metrics with very low usages. Generally, if a user never accesses a particular metric, the metric is unlikely to be relevant to the user. This way, embodiments described herein can also account for user preference drifting. To this end, if a user stops accessing a metric that the user previously accessed or used, the a parameter of that metric will decrease and therefore be less likely to be recommended.

In some implementations, the particular function (e.g., linear combination function or geometric combination function) utilized may be selected by a developer, user, or the like. In other implementations, the particular function may be automatically determined, for example, based on a metric, based on the data, etc. The geometric combination function may produce results that are less impacted by short-term spikes in the amount of usage.

As can be appreciated, with the usage updating process, both parameters $\alpha$ and $\beta$ are bounded irrespective of a number of updates (from usage data) have been performed. For illustration purposes, assume $$\frac{c_i}{\Omega}$$

always equals to 1, meaning the metric always has the largest usage count for all iterations. In such a case, $\alpha$, which is initially set to be 1, at the $T^{th}$ iteration would be represented as:

$$(((1*\kappa+1)*\kappa+1)\ldots)*\kappa+1$$

This converges to $$\frac{1}{1-\kappa}.$$

For $\kappa = 0.5$, it is converging to 2. $\beta$ converges to 0 based on the updating rule. The expected relevancy score would be $$\frac{\alpha}{\alpha + \beta} = \frac{2}{2+0} = 1.$$

As a particular example, the expected relevancy score would be 0.94 after only three updates. As such, this metric will quickly become relevant to the user.

On the other hand, assume $$\frac{c_i}{\Omega}$$

always equal to 0, meaning the metric is never used. Then parameter $\alpha$, initially set to be 1, at the $T^{th}$ iteration would be represented as:

$$(((1*\kappa+0)*\kappa+0)\ldots)*\kappa+0$$

This converges to 0, while β converges to $$\frac{1}{1-\kappa}.$$

As such, the expected relevancy score would be 0, and the metric is very unlikely to be relevant to the user.

In implementation, the bounded distribution parameters can provide some advantages. For example, updating by usage has a much lower weight than updating by user feedbacks (e.g., implicit positive feedback). In this regard, in the feedback updating process, one implicit positive feedback would increase α by 1. Even if many iterations of usage updating have reduced the α value to be near 0 (because the metric has rarely been accessed), two user feedbacks will bring α to 2, the same level as β, thereby impactfully changing its relevancy score.

Further, α+β is bounded by $$\frac{1}{1-\kappa},$$

for κ=0.5, α+β=2. As described, the variance of the Beta distribution depends on (α+β). When the sum is small, the variance is larger. As such, the relevance score is not as reflective to usage updating. Even for a metric which has a low expected relevancy score, the metric has some chance of getting a high score when sampling the value from the Beta distribution (due to a large variance). As a result, the metric may be selected as relevant to the user with the possibility to be selected or clicked on if the user is interested, thus increasing its expected relevance score significantly as discussed above.

The usage updating process may be performed on a periodic basis or upon an occurrence of an event. For example, the usage updating may be performed to increment the positive and/or negative parameter on a weekly basis. As another example, the usage updating may be performed to update the positive and/or negative parameters as usage data is obtained or recognized. For instance, upon identifying reception of usage data, the value of the positive parameter and/or negative parameter may be adjusted accordingly.

Upon determining distribution parameter values for each metric, the parameter values can be stored in the data store 214, for example in association with the corresponding metric. Advantageously, storing such parameter values enables the service to be stateless and fault tolerant.

In one example implementation of the parameter update logic, assume the feedback updating process is performed as implicit positive feedback is obtained and the usage updating process is performed on a periodic basis (e.g., on a weekly basis as identification of relevant metrics is being performed). Further assume that the positive parameter and negative parameter are both initially established as having a parameter value of one.

Initially, for the feedback updating process, as implicit positive feedback is obtained or recognized, the α count for the corresponding metric is increased by a value of 1. Assume that on a first day, the metric, or data associated therewith, was selected or clicked on by a user, providing an implicit positive feedback increasing the α parameter value to 2. Further assume that on a second day, the metric, or data associated therewith, was again selected by a user, providing an implicit positive feedback increasing the α parameter value to 3. As discussed, the increased α parameter values can be stored in connection with the metric in a data store, such as data store 214. Although not part of the example, as briefly described above, in embodiments that include implicit negative feedback, β parameter value could be updated at this time as well by incrementing values based on implicit negative feedback obtained.

Now assume a time duration has lapsed, such as a week, and the usage updating process is performed to update the positive and negative distribution parameters. In this example, assume the linear combination function is being employed to update the distribution parameters. Further, assume that the maximal usage over all metrics is 10, the usage count for the particular metric being analyzed is 4, and the decay factor is 0.5. In such a case, the a parameter value can be determined using the linear combination function:

$$f^1(a, u) = \kappa * \alpha_i + \frac{c_i}{\Omega}$$

Using the example data results in $$(0.5 * 3) + \left(\frac{4}{10}\right)$$

equaling a α parameter value of 1.9. Such a value can be stored in a data store. Assume now that, at a later date, another implicit positive feedback is received. In such a case, the 1.9 α parameter value is increased to 2.9 via the feedback updating process. Thereafter, when performing another usage updating process, the 2.9 is accessed and used as the $\alpha_i$ parameter for updating based on usage.

Continuing with this example, the β parameter value can be determined using the linear combination function:

$$f^1(a, u) = \kappa * \beta_i + \left(1 - \frac{c_i}{\Omega}\right)$$

Using the example data results in $$(0.5 * 1) + \left(1 - \frac{4}{10}\right)$$

equaling a β parameter value of 1.1. Such a value can be stored in a data store. During a next usage updating process (e.g., the next week), the 1.1 parameter value is accessed and used as the $\beta_i$ parameter for updating based on usage. Such a process can be implemented and performed for each metric to obtain corresponding parameters.

The distribution generator 224 is generally configured to generate a distribution for each metric using the corresponding parameter values. In this regard, for each metric, the distribution generator 224 can use the determined parameter values, such as the positive and negative parameter values, to generate a corresponding distribution. In embodiments, the distribution generator 224 generates a Beta distribution.

Generally, the Beta distribution may be parametrized in terms of its mean μ (0<μ<1) and sample size v=α+β(v>0). Using this parametrization, the variance can be expressed in terms of the mean μ and the sample size v as follows:

$$\text{var}(X) = \frac{\mu(1-\mu)}{1+v}$$

As such, the more samples, the less the variance. The expected value (mean) of a Beta distribution random variable X with parameters α and β is a function of only the ratio β/α of these parameters:

$$\mu = E[X] = \int_0^1 xf(x; \alpha, \beta)dx$$
$$= \int_0^1 x \frac{x^{\alpha-1}(1-x)^{\beta-1}}{B(\alpha, \beta)} dx$$
$$= \frac{\alpha}{\alpha + \beta}$$
$$= \frac{1}{1 + \frac{\beta}{\alpha}}$$

Figure 3:
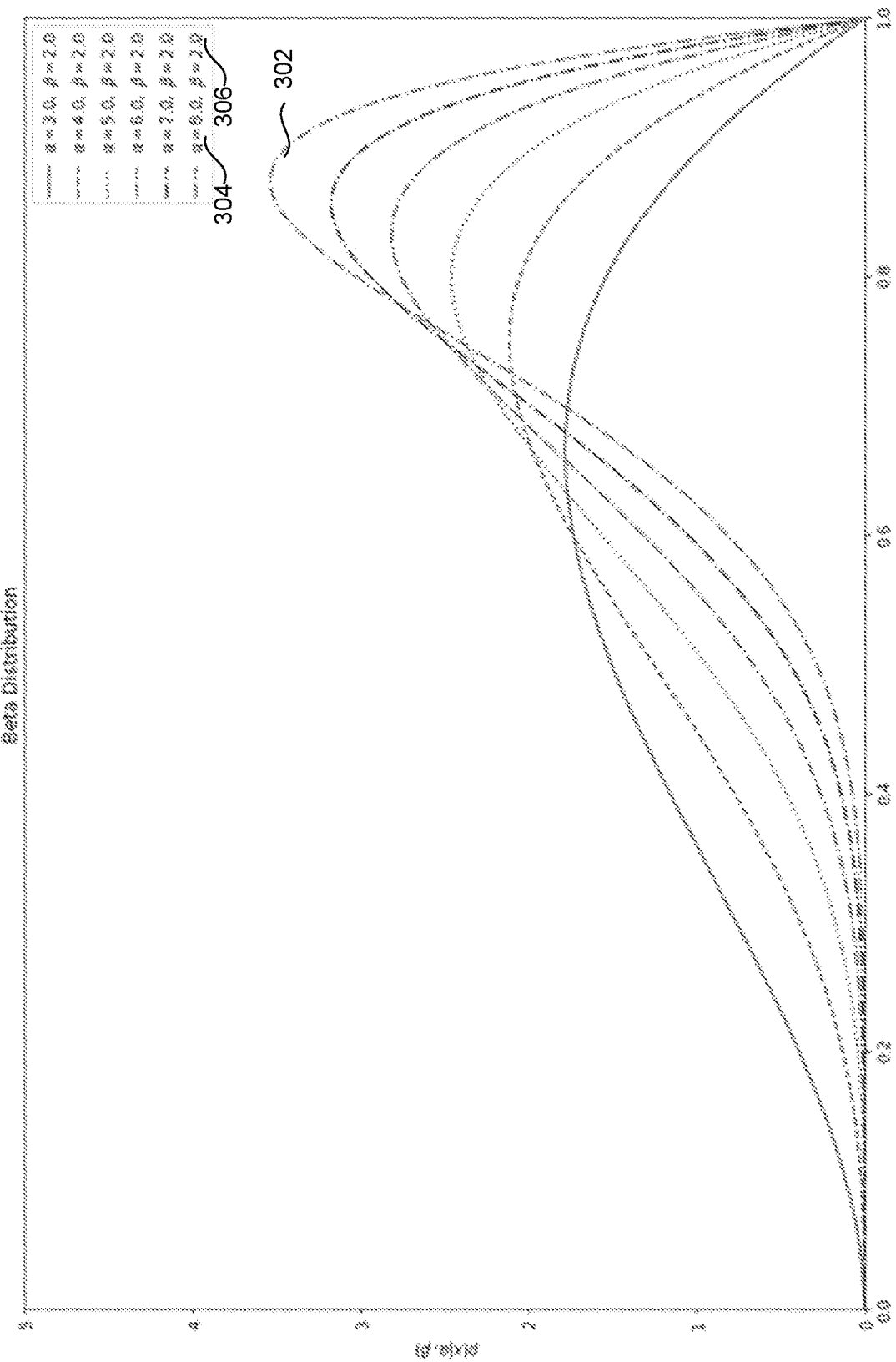
FIG. 3 provides an example distribution for multiple metrics, in accordance with aspects of the technology described herein.

FIG. 3 provides one example of different Beta distributions with a fixed negative parameter β. Each distribution corresponds with a different metric and corresponding distribution parameters. For example, distribution 302 corresponds with a particular having distribution parameter α 304 equal to 8 and distribution parameter β 306 equal to 2. The higher the α parameter for a metric, the distribution is more shifted toward the right. As a result, it is more likely that the relevance score (draw from the distribution) is higher and, as such, that metric is more likely to be identified as relevant to a user. Although FIG. 3 represents a distribution provided via a graph, as can be appreciated, a distribution can be represented in any form, including an array of values, a graph, etc.

The relevant metric selector 226 is generally configured to generate relevance scores for metrics. A relevance score refers to a score or value that indicates an extent or measure of relevance of a metric to a particular user. In embodiments, relevant metric selector 226 can generate a relevance score for a metric by performing a sampling of the distribution associated with the corresponding metric. For example, a random sampling of a Beta distribution that models the metric relevancy distribution may be performed according to the relevancy distribution of that metric and designated as the relevance score for that metric. The probability density function (PDF) of the Beta distribution, for $0 \leq x \leq 1$, and shape parameters α, β>0, is:

$$f(x, \alpha, \beta) = \frac{1}{B(\alpha, \beta)} x^{\alpha-1}(1-x)^{\beta-1}$$

With brief reference to FIG. 3, to determine a relevance score for a metric corresponding with distribution 302, a sampling of distribution 302 may occur to obtain a relevance value. In this example, the relevance score is more likely to be around a value of 0.9, but can have a range that corresponds with the distribution 302.

Generally, enlarging α and β reduce the variance, meaning the sampled relevance score is more likely closer to the mean. On the other hand, reducing α and β increases the variance, thus the relevance score will be more random. When both α and β are close to 1, the relevance score will be almost uniformly distributed. As a result, the associated metric can have a relevance score anywhere from 0 to 1, with almost equal probability. If all metrics have the corresponding parameter value α close to 1, any metric has the same chance of being recommended to the user.

In accordance with identifying relevance scores for each metric of a set of candidate metrics, the relevant metric selector 226 can rank and/or select the metrics for relevancy to a user. For example, the set of metrics may be ranked based on the relevance scores. Thereafter, a predetermined number of metrics may be selected as relevant to the user. As another example, metrics associated with relevance scores exceeding a threshold value may be selected as relevant to the user.

The relevant data provider 228 is generally configured to provide or output relevant data 256. In some cases, the relevant data is the relevant metric. As such, the selected relevant metric, or indication thereof, may be provided to the user. For example, a list of relevant metrics, or indications thereof, may be provided to a user via a communication channel (e.g., email, website, etc.). In other cases, the relevant data provider 228 may access data associated with a metric identified as relevant and provide such data to the user. For example, upon identifying a revenue metric as relevant to a user, anomalies or other data associated with that revenue metric may be provided to the user.

In some cases, the relevant data provider 228 may provide relevant data to a user device for presentation to a user. In such cases, the user may view the relevant data. Additionally or alternatively, the relevant data provider 228 may provide relevant data, for example, to the data store 214 and/or data analytics service (e.g., data analytics service 116 of FIG. 1). For example, a metric identified as relevant to a user can be provided to a data analytics service.

The data analytics service may obtain any relevant data, such as an indication of a relevant metric. Generally, as described herein, the data analytics service can use such data to perform further data analysis (e.g., perform analysis related to a metric identified as relevant to the user) and/or provide relevant data to a user device. The data analytics service may be any type of server or service that can analyze data and/or provide information to user devices.

In some embodiments, the data analytics service can use relevant metrics output via the relevant data manager 212 to generate a visualization to present to the user. For instance, relevant data may be presented in a graphical form or in a chart form to illustrate metric values over time. For example, data values associated with a relevant metric may be charted over time to provide indications of historical data, anomalies, or the like.

In yet another implementation, relevant data (e.g., relevant metrics) may be used to generate insights related to a relevant metric. For example, based on an identified relevant metric for a user, suggestions or recommendations can be identified and presented to a user. The insights or suggestions may be based on any number of factors. For example, insights may be based on anomalies associated with a relevant metric.

Data analytics service may use relevant data in any number of ways. Further, data analytics service may provide various data visualizations for presentation to users. The particular utilization and/or visualizations implemented via a data analytics service may be configured in any number of ways. In some cases, such use of related data may be customized or specific to a consumer of the information (e.g., a user).

Exemplary Implementations for Efficiently Identifying Relevant Metrics

Figure 4:
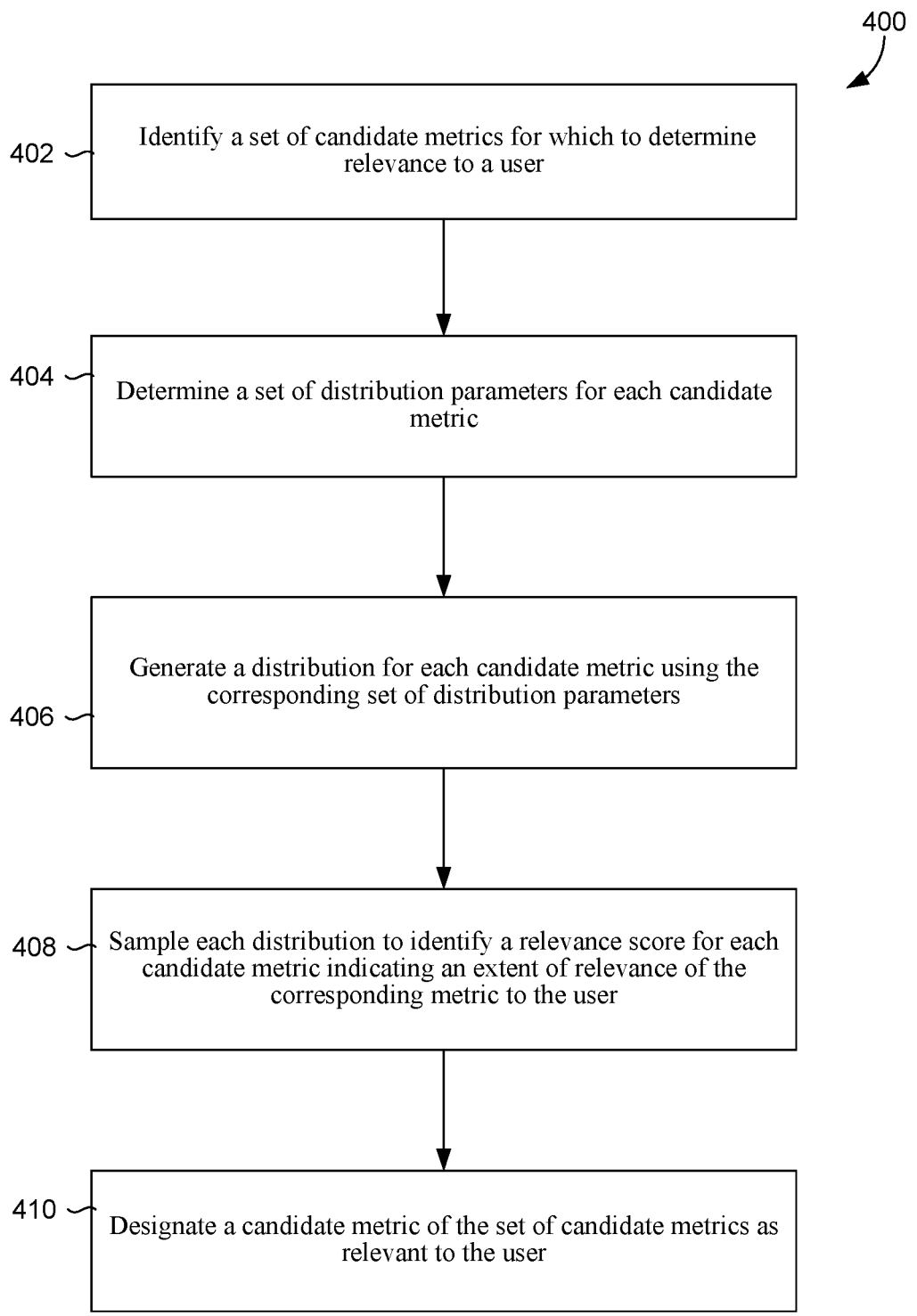
FIG. 4 provides a first example method for facilitating efficient identification of relevant metrics, in accordance with aspects of the technology described herein.
Figure 5:
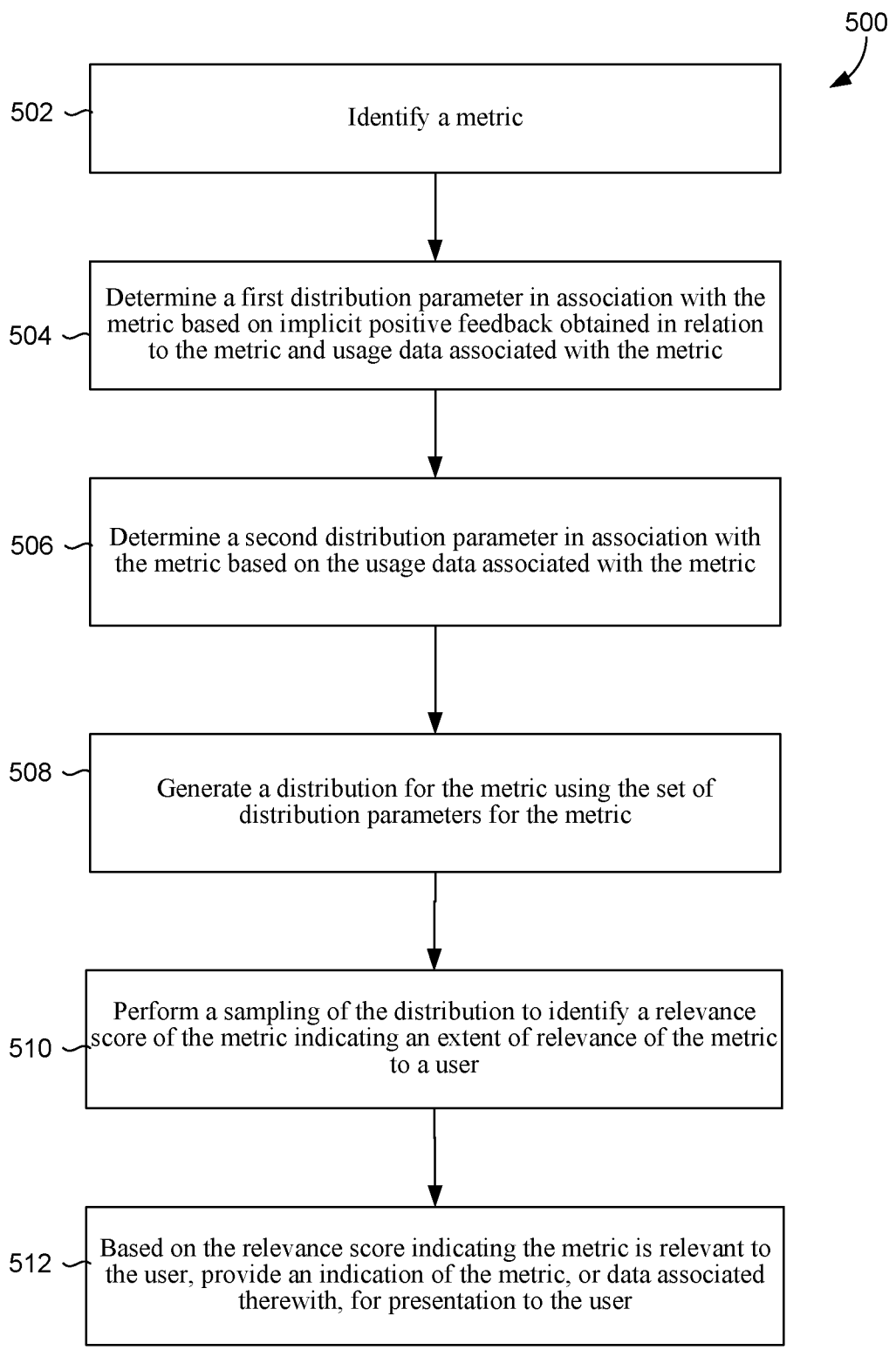
FIG. 5 provides a second example method for facilitating efficient identification of relevant metrics, in accordance with aspects of the technology described herein.

As described, various implementations can be used in accordance with embodiments described herein. FIGS. 4-5 provide methods of facilitating efficient identification of relevant metrics, in accordance with embodiments described herein. The methods 400 and 500 can be performed by a computer device, such as device 600 described below. The flow diagrams represented in FIGS. 4-5 are intended to be exemplary in nature and not limiting.

Turning initially to method 400 of FIG. 4, method 400 is directed to facilitating efficient identification of relevant metrics, in accordance with embodiments of the present technology. Initially, at block 402, a set of candidate metrics for which to determine relevance to a user is identified. In some embodiments, the set of candidate metrics can be identified based on each candidate metric being associated with an anomaly in corresponding data. At block 404, a set of distribution parameters are determined for each candidate metric. As an example, a first distribution parameter may be determined based on implicit positive feedback associated with the metric and usage data, and a second distribution parameter may be determined based on the usage data. At block 406, a distribution is generated for each candidate metric using the corresponding set of distribution parameters. In embodiments, the distribution is a Beta distribution using two parameter values that define or shape the distribution. Thereafter, at block 408, each distribution is sampled or used to identify a relevance score for each candidate metric indicating an extent of relevance of the corresponding metric to the user. Based on the relevance scores for each candidate metric, at block 410, a candidate metric of the set of candidate metrics is designated as relevant to the user. Based on the candidate metric designated as relevant, an indication of the candidate metric, or data associated therewith, can be provided to the user device for display via a graphical user interface.

Turning now to FIG. 5, method 500 is directed to facilitating efficient identification of relevant metrics, in accordance with embodiments of the present technology. Initially, at block 502, a metric is identified. Such a metric may be identified based on being associated with an anomaly. At block 504, a first distribution parameter in association with the metric is determined based on implicit positive feedback obtained in relation to the metric and usage data associated with the metric. The implicit positive feedback can be obtained in accordance with the user selecting or clicking on data associated with the metric. Usage data can be obtained in accordance with the user selecting or clicking on data associated with the metric. In some embodiments, the first distribution parameter may be determined by incrementing a previous parameter value in accordance with a number of implicit positive feedback obtained and, thereafter, updated based on the usage data associated with the metric. At block 506, a second distribution parameter in association with the metric is determined based on the usage data associated with the metric. At block 508, a distribution is generated for the metric using the set of distribution parameters for the metric. As can be appreciated, the distribution is generated without any explicit feedback from the user in relation to the metric. Thereafter, at block 510, a sampling of the distribution is performed to identify a relevance score of the metric indicating an extent of relevance of the metric to a user. In embodiments, a relevance score can indicate the metric is relevant to the user based on the relevance score being a set of highest relevance scores among a set of relevance scores or based on the relevance score exceeding a threshold relevance value. Based on the relevance score indicating the metric is relevant to the user, at block 512, an indication of the metric, or data associated therewith, is provided for presentation to the user.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Referring to the drawings in general, and initially to FIG. 6 in particular, an exemplary operating environment for implementing aspects of the technology described herein is shown and designated generally as computing device 600. Computing device 600 is just one example of a suitable computing environment and is not intended to suggest any limitation as to the scope of use or functionality of the technology described herein. Neither should the computing device 600 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, an illustrative power supply 622, and a radio(s) 624. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 6 is merely illustrative of an exemplary computing device that can be used in connection with one or more aspects of the technology described herein. Distinction is not made between such categories as "workstation," "server," "laptop," and "handheld device," as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, and optical-disc drives. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, and vibrating component. I/O port(s) 618 allow computing device 600 to be logically coupled to other devices including I/O components 620, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 600. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include radio(s) 624. The radio 624 transmits and receives radio communications. The computing device may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. One or more computer storage media having computer-executable instructions embodied thereon that, when executed by one or more processors, cause the one or more processors to perform a method, the method comprising:

determining a set of distribution parameters for a metric corresponding with a quantitative measure used to perform analytics, wherein a first distribution parameter is determined based on implicit positive feedback obtained in relation to the metric and usage data associated with the metric and a second distribution parameter is determined based on the usage data associated with the metric, wherein the second distribution parameter is further determined using direct implicit negative feedback obtained in accordance with the user not selecting or clicking on data associated with the metric, wherein the metric is selected from a set of metrics measuring various performance data associated with an organization and is selected based on an occurrence of an anomaly associated with the metric;

generating a distribution for the metric using the set of distribution parameters for the metric;

sampling the distribution to identify a relevance score of the metric indicating an extent of relevance of the metric to a user, wherein the relevance score indicates the metric is relevant to the user based on the relevance score being in a set of highest relevance scores among a set of relevance scores or based on the relevance score exceeding a threshold relevance value; and based on the relevance score indicating the metric is relevant to the user, providing an indication of the metric, or data associated therewith, for presentation to the user.

2. The computing system of claim 1, wherein the distribution is generated without any explicit feedback from the user.

3. The computing system of claim 1, wherein the implicit positive feedback is obtained in accordance with the user selecting or clicking on data associated with the metric.

4. The computing system of claim 1, wherein the usage data is obtained in accordance with the user accessing or using data associated with the metric.

5. The computing system of claim 1, wherein determining the set of distribution parameters for the metric is performed via a feedback updating process to update the first distribution parameter based on the implicit positive feedback and a usage updating process to update the first distribution parameter and the second distribution parameter based on the usage data.

6. The computing system of claim 1, wherein the set of relevance scores includes a plurality of relevance scores that correspond with other metrics.

7. The computing system of claim 1, wherein the usage data is provided via a remote analytics system that captures usage data from user interactions with a website or an application.

8. The method of claim 1, wherein the direct implicit negative feedback is obtained based on low usage count.

9. The method of claim 1, wherein the direct implicit negative feedback is obtained based on usage data and a number of negative feedbacks.

10. A computer-implemented method comprising:
identifying a set of candidate metrics for which to determine relevance to a user;
determining a set of distribution parameters for each candidate metric, each set of distribution parameters including a first distribution parameter based on implicit positive feedback associated with the metric, wherein determining the set of distribution parameters for each candidate metric includes determining the first distribution parameter based further on usage data associated with the metric and determining a second distribution parameter using the usage data associated with the metric and direct implicit negative feedback obtained in accordance with the user not selecting or clicking on data associated with a candidate metric from the set of candidate metrics and, wherein the candidate metric is selected from the set of candidate metrics measuring various performance data associated with an organization and is selected based on an occurrence of an anomaly associated with the metric;
generating a distribution for each candidate metric using the corresponding set of distribution parameters;
sampling each distribution to identify a relevance score for each candidate metric indicating an extent of relevance of the corresponding metric to the user, wherein the relevance score indicates the metric is relevant to the user based on the relevance score being in a set of highest relevance scores among a set of relevance scores or based on the relevance score exceeding a threshold relevance value; and
based on the relevance scores for each candidate metric, designating at least one candidate metric of the set of candidate metrics as relevant to the user.

11. The method of claim 10, wherein the set of distribution parameters is determined without any explicit feedback provide by the user.

12. The method of claim 10 further comprising providing an indication of the at least one candidate metric, or data associated therewith, to a user device for display.

13. A computing system comprising:
a processor; and
computer storage memory having computer-executable instructions stored thereon which, when executed by the processor, configure the computing system to:
means for determining a set of distribution parameters for a metric, wherein a first distribution parameter is determined based on implicit positive feedback obtained in relation to the metric and usage data associated with the metric and a second distribution parameter is determined based on the usage data associated with the metric, wherein the second distribution parameter is determined using the usage data associated with the metric and direct implicit negative feedback obtained in accordance with the user not selecting or clicking on data associated with a metric from a set of metrics and wherein the metric is selected from the set of metrics measuring various performance data associated with an organization and is selected based on an occurrence of an anomaly associated with the metric;
means for generating a distribution for the metric using the set of distribution parameters for the metric; and
means for identifying a relevance score of the metric using the distribution, the relevance score indicating an extent of relevance of the metric to a user, wherein the relevance score indicates the metric is relevant to the user based on the relevance score being in a set of highest relevance scores among a set of reference scores or based on the relevance score exceeding a threshold relevance value.

14. The media of claim 13, wherein the relevance score is identified based on a random sampling of the distribution.

15. The media of claim 13 further comprising means for providing an indication of the metric as relevant to the user.

16. The media of claim 13, wherein the implicit positive feedback is obtained in accordance with the user selecting or clicking on data associated with the metric, and the usage data is obtained in accordance with the user accessing or using data associated with the metric.

* * * * *